(12) United States Patent
Jeon et al.

(10) Patent No.: US 7,847,220 B2
(45) Date of Patent: Dec. 7, 2010

(54) STEAM GENERATOR AND HEATING COOKING APPARATUS HAVING THE SAME

(75) Inventors: Ki Suk Jeon, Seongnam-si (KR); Kobayashi Shozo, Suwon-si (KR); Seok Weon Hong, Yongin-si (KR); Jong Chull Shon, Suwon-si (KR); Hyang Ki Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 384 days.

(21) Appl. No.: 11/802,750

(22) Filed: May 24, 2007

(65) Prior Publication Data
US 2008/0075822 A1    Mar. 27, 2008

(30) Foreign Application Priority Data
Sep. 27, 2006    (KR) .................. 10-2006-0094437

(51) Int. Cl.
*A21B 1/00* (2006.01)
*A23P 1/00* (2006.01)
(52) U.S. Cl. ...................................... 219/401
(58) Field of Classification Search ............... 219/401; 426/510; 122/491
See application file for complete search history.

(56) References Cited

FOREIGN PATENT DOCUMENTS

| JP | 09-010759 | | 1/1997 |
|---|---|---|---|
| JP | 2004-162936 | | 6/2004 |
| WO | 2006-024852 | * | 3/2006 |
| WO | WO2006/024852 A1 | | 3/2006 |

OTHER PUBLICATIONS

Chinese Office Action for corresponding Chinese Patent Application No. 2007101042158 dated Jun. 26, 2009.

* cited by examiner

*Primary Examiner*—Shawntina Fuqua
(74) *Attorney, Agent, or Firm*—Staas & Halsey LLP (57) ABSTRACT

A steam generator capable of preventing scale contained in air bubbles and water droplets generated in the course of boiling water by a heater from entering a steam ejection hole and a heating cooking apparatus having the steam generator is provided. The steam generator includes a steam container to store water and having at least one steam ejection hole formed at an upper location thereof, a heater adapted to heat the water stored in the steam container so as to generate steam, and a barrier unit provided below the steam ejection hole and adapted to prevent the air bubbles from entering the steam ejection hole. The barrier unit includes a base plate having a plurality of steam passage holes and a web plate coming into close contact with an inner wall surface of the steam container.

18 Claims, 10 Drawing Sheets

STEAM GENERATOR AND HEATING COOKING APPARATUS HAVING THE SAME

CROSS-REFERENCE TO RELATED APPLICATIONS

This application claims the benefit of Korean Patent Application No. 10-2006-0094437, filed on Sep. 27, 2006 in the Korean Intellectual Property Office, the disclosure of which is incorporated herein by reference.

BACKGROUND OF THE INVENTION

1. Field of the Invention

The present invention relates to a steam generator, and, more particularly, to a steam generator capable of preventing impurities, such as water droplets, air bubbles, etc., from entering a steam ejection hole, and a heating cooking apparatus having the steam generator.

2. Description of the Related Art

Examples of heating cooking apparatuses used to cook food include a microwave oven using high frequency microwaves, and an oven using a heater. The microwave oven can only cook limited types of food, although the food is cooked within a relatively short time. The microwave oven also suffers from deterioration in the quality of cooked food because of excessive drying of the food. On the other hand, although the oven using a heater guarantees better quality of food because the food is cooked in an optimized closed space, the oven has problems of excessively long cooking time and low cooking efficiency because low density air acts as a heat transfer medium between the heater and food.

Recently, to compensate for the above described problems of the heating cooking apparatuses, heating cooking apparatuses for supplying heat to food via steam (vapor) have been developed. One example of this type of heating cooking apparatus is disclosed in Japanese Patent Laid-open No. 2004-0162936. The disclosed conventional heating cooking apparatus includes a steam generator for generating steam.

Conventionally, a steam generator includes a tank for storing water therein and a heater for heating the water. After heating and evaporating the water stored in the tank, the steam generator supplies the resulting vapor into a cooking compartment.

However, in the conventional heating cooking apparatus using the above described steam generator, there are problems in that air bubbles, which are generated in the course of boiling water by use of a heater and which grow to an excessively large size, or water droplets, which are generated as the air bubbles burst, are introduced into a steam ejection hole of the steam generator, thus preventing the generation of steam. Another problem is that scale may be accumulated around the steam ejection hole due to the use of tap water, thus causing the steam ejection hole to be clogged or narrowed.

SUMMARY OF THE INVENTION

Accordingly, it is an aspect of the present invention to solve the above problems.

It is another aspect of the present invention to provide a steam generator capable of preventing scale, which is included in air bubbles or water droplets generated in the course of boiling water in the steam generator, from entering a steam ejection hole.

It is still another aspect of the present invention to provide a heating cooking apparatus having the steam generator.

Additional aspects and/or advantages of the invention will be set forth in part in the description which follows and, in part, will be apparent from the description, or may be learned by practice of the invention.

The foregoing and/or other aspects are achieved by providing a steam generator comprising: a steam container to store water therein and having at least one steam ejection hole formed at an upper location thereof; a heater to boil the water stored in the steam container so as to generate steam and a barrier unit provided below the steam ejection hole and adapted to prevent air bubbles generated in the course of boiling the water stored in the steam container by the heater from entering the steam ejection hole, wherein the barrier unit comprises a base plate having a plurality of steam passage holes, and a web plate coming into close contact with an inner wall surface of the steam container.

The steam passage holes may have an elongated hole shape. The barrier unit may further comprise a plurality of lattice members formed at the base plate. The lattice members may be configured to protrude upward and downward from the base plate.

Each unit lattice defined by the plurality of lattice members may comprise at least one of the plurality of steam passage holes. Each steam passage hole may be located to come into contact with an associated one of the lattice members. Each unit lattice may comprise two steam passage holes located to come into contact with two lattice members facing each other.

The base plate within each unit lattice may descend toward the steam passage hole formed at the unit lattice. The base plate within each unit lattice may descend. The base plate within each unit lattice may have a convex shape. The barrier unit may have chamfered corners.

It is another aspect of the present invention to provide a heating cooking apparatus comprising: a housing; a cooking compartment; an electric equipment chamber provided in the housing; and a steam generator provided in the electric equipment chamber to supply steam into the cooking compartment, the steam generator comprising: a steam container to store water therein and having at least one steam ejection hole formed at an upper location thereof, a heater to boil the water stored in the steam container, so as to generate steam, and a barrier unit provided below the steam ejection hole to prevent air bubbles generated in the course of boiling the water stored in the steam container by the heater from entering the steam ejection hole.

The barrier unit may comprise a base plate having a plurality of steam passage holes and a web plate coming into close contact with an inner wall surface of the steam container. The steam passage holes may have an elongated hole shape. The barrier unit may further comprise a plurality of lattice members, and the respective neighboring steam passage holes may be arranged in the base plate to be separated from each other by an associated one of the plurality of lattice members.

Each steam passage hole may be located to come into contact with an associated one of the lattice members. The respective neighboring steam passage holes may have a height difference.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to like elements throughout. The embodiments are described below to explain the present invention by referring to the figures.

Figure 1:
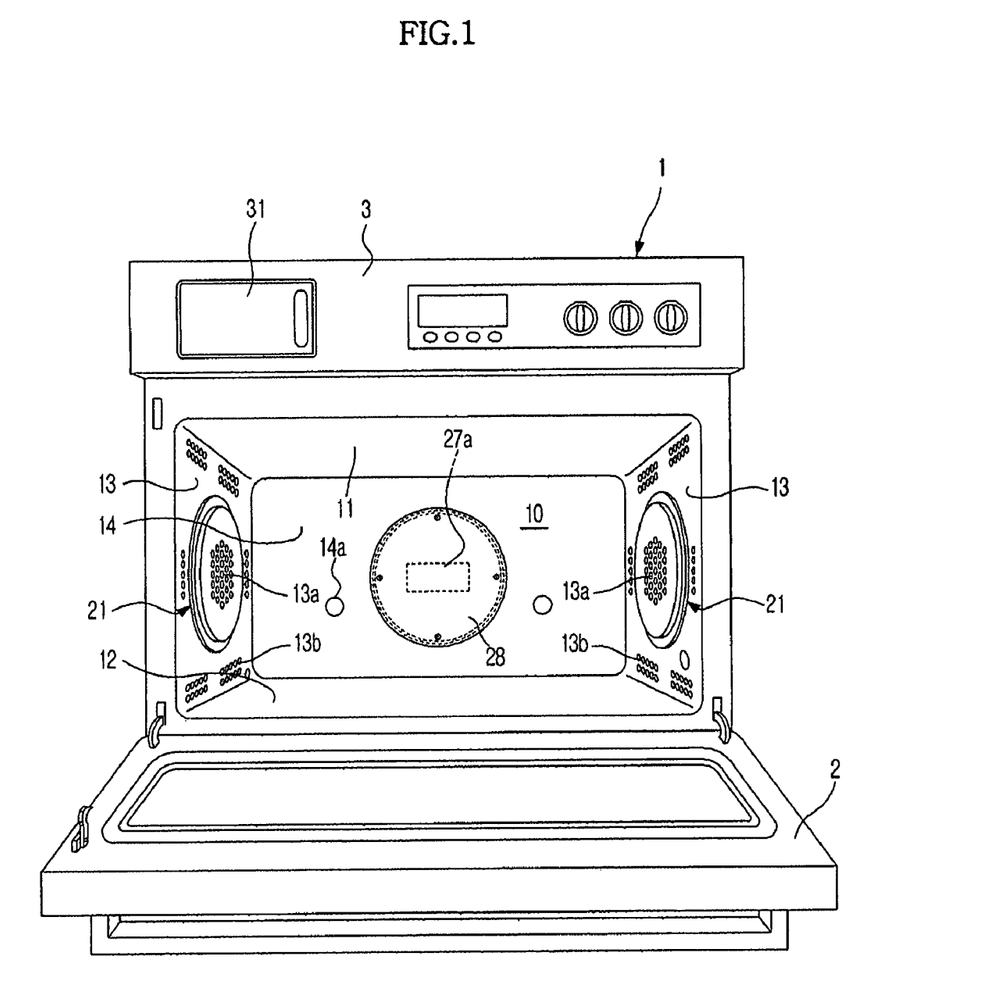
FIG. 1 is a front view showing a heating cooking apparatus according to an embodiment of the present invention.
Figure 2:
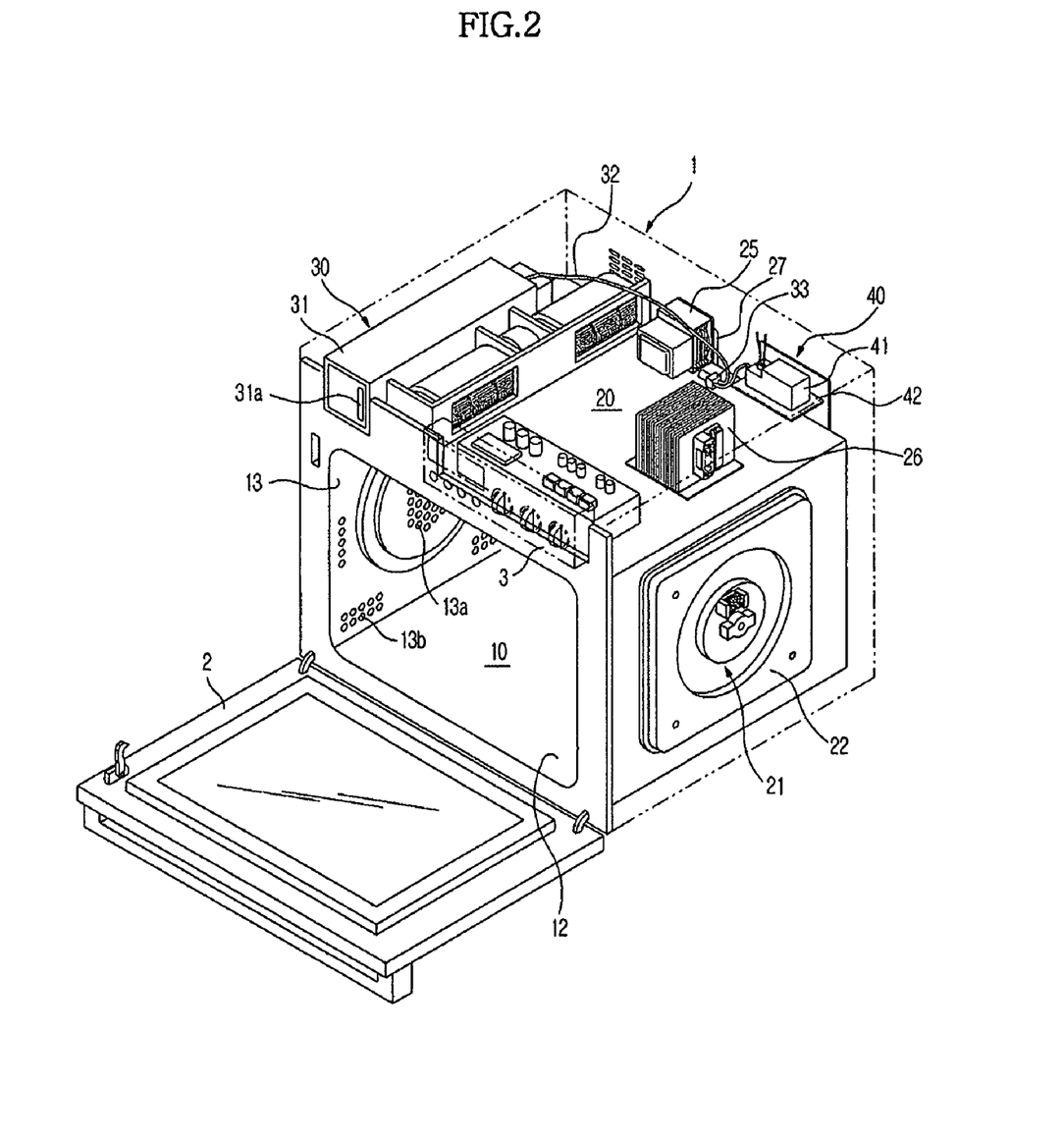
FIG. 2 is a perspective view of the heating cooking apparatus of FIG. 1.

FIGS. 1 and 2 are respectively a front view and a perspective view showing a heating cooking apparatus according to the present invention. As shown, the heating cooking apparatus includes a housing 1 defining the overall outer appearance of the apparatus, a cooking compartment 10 defined in the housing 1 to have a predetermined space with the housing 1, a door 2 installed to open and close a front side of the cooking compartment 10, and a control panel 3 provided at an upper side of the cooking compartment 10 and used to control the operation of the heating cooking apparatus.

The cooking compartment 10 is a space defined by a top plate 11, a bottom plate 12, opposite side plates 13, and a rear plate 14. An electric equipment chamber 20 containing a variety of electric elements is defined between the cooking compartment 10 and the housing 1.

The heating cooking apparatus further includes convection modules 21, a magnetron 25, a water supply device 30, and a steam generator 40, which are arranged in the electric equipment chamber 20, to allow food to be cooked by use of any one selected from among heat, high-frequency microwaves, or vapor.

Each of the convection modules 21 includes a heater case 22 mounted at an outer surface of either side plate 13 of the cooking compartment 10, a circulating fan (not shown) installed in the heater case 22 for the internal circulation of vapor, and a convection heater (not shown) mounted around the circulating fan and adapted to heat air blown by the circulating fan.

Each side plate 13 of the cooking compartment 10 has a plurality of inlet holes 13a and outlet holes 13b, to allow air inside the cooking compartment 10 to be circulated into and heated by the convection module 21. Specifically, if the air is introduced into the heater case 22 through the inlet holes 13a, the air is heated while passing through the convection heater (not shown) of the convection module 21, and then is discharged into the cooking compartment 10 through the outlet holes 13b, so as to raise an interior temperature of the cooking compartment 10.

The magnetron 25 is mounted on the top plate 11 of the cooking compartment 10 and adapted to supply high frequency microwaves into the cooking compartment 10. Also, a high-voltage transformer 26 is mounted on the top plate 11 and adapted to apply a high voltage to the magnetron 25. A waveguide pipe 27 is mounted at an outer surface of the rear plate 14 of the cooking compartment 10 and adapted to guide the high frequency microwaves generated from the magnetron 25 into the cooking compartment 10. The rear plate 14 of the cooking compartment 10 has an opening 27a to allow the high frequency microwaves guided through the waveguide pipe 27 to be introduced into the cooking compartment 10. The opening 27a is covered with a cover 28.

The water supply device 30 includes a water tank 31 detachably mounted in the electric equipment chamber 20 at the upper side of the cooking compartment 10, a water supply pipe 32 to supply water stored in the water tank 31 into the steam generator 40, and a water supply pump 33 installed on the water supply pipe 32.

Figure 3:
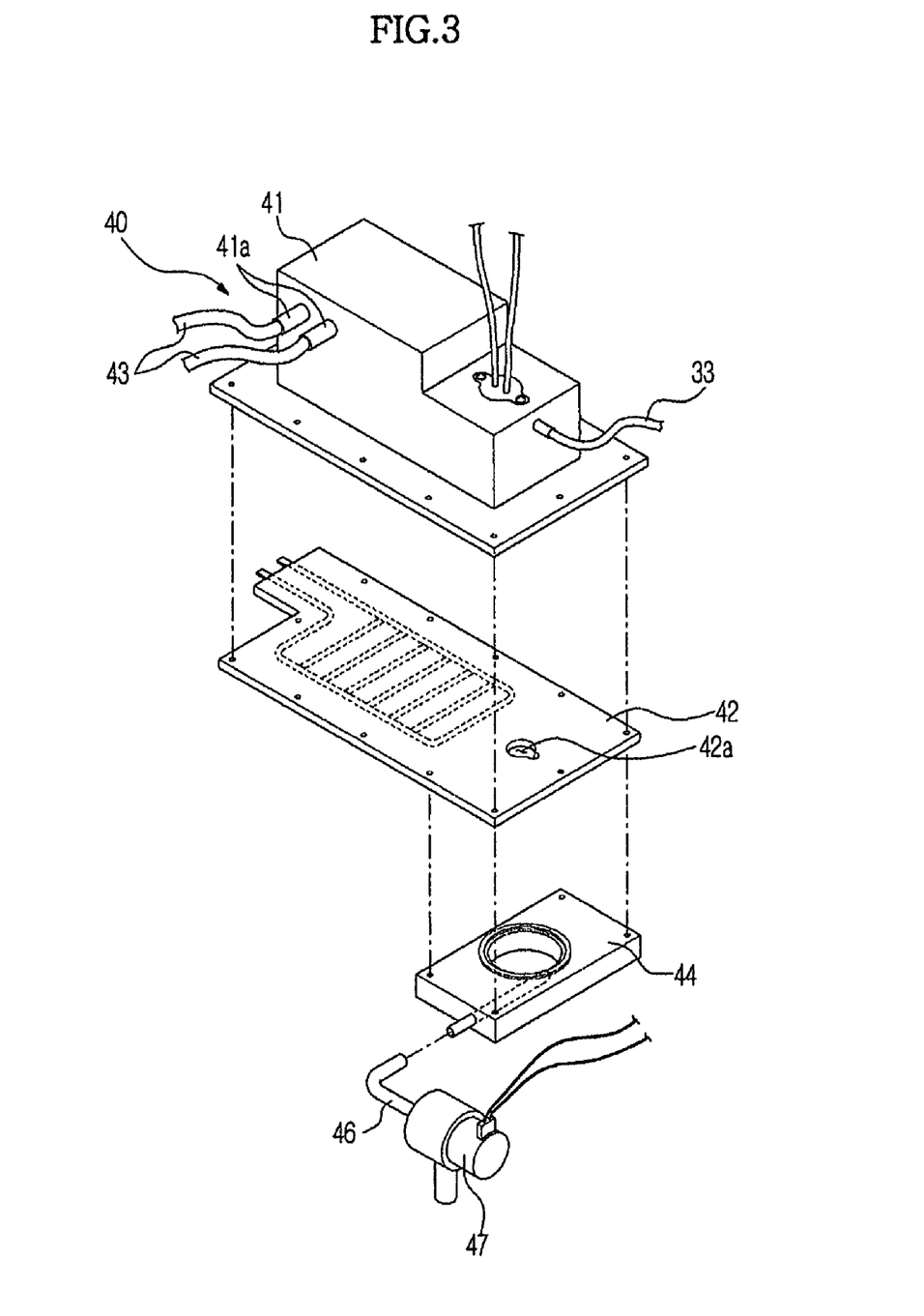
FIG. 3 is an exploded perspective view showing a steam generator included in the heating cooking apparatus of FIG. 1.

The steam generator 40, as shown in FIG. 3, includes a steam container 41 to store water supplied from the water supply pump 33 of the water supply device 30, a steam heater 42 coupled to a lower portion of the steam container 41 and adapted to heat the water stored in the steam container 41 so as to generate vapor, and a drain guiding member 44 coupled to a lower portion of the steam heater 42 and adapted to guide the water within the steam generator 40 to a drain pipe 46.

The steam container 41 has a rectangular chamber shape, and is formed, at an upper portion of a sidewall thereof, with at least one steam ejection hole 41a, to which a steam supply pipe 43 is connected. The steam supply pipe 43 is installed to connect the steam container 41 to a vapor supply hole 14a (See FIG. 1) perforated in the rear plate 14 of the cooking compartment 10, so as to supply vapor generated in the steam container 41 into the cooking compartment 10.

The steam heater 42 takes the form of a plane heater suitable to heat the overall lower portion of the steam container 41 uniformly. The steam heater 42 has a drain hole 42a perforated in a side position thereof to discharge the water, remaining in the steam generator 40 after the generation of vapor, into the cooking compartment 10. The drain pipe 46 is connected to a side of the drain guiding member 44. The drain pipe 46 is provided with a drain valve 47, which is adapted to be selectively opened and closed to discharge or store the water within the steam generator 40.

A barrier unit 50 is provided in the steam generator 40, more particularly, provided in the steam container 41. The barrier unit 50 serves to prevent air bubbles generated in the course of boiling water from entering the steam ejection hole 41a.

Figure 4:
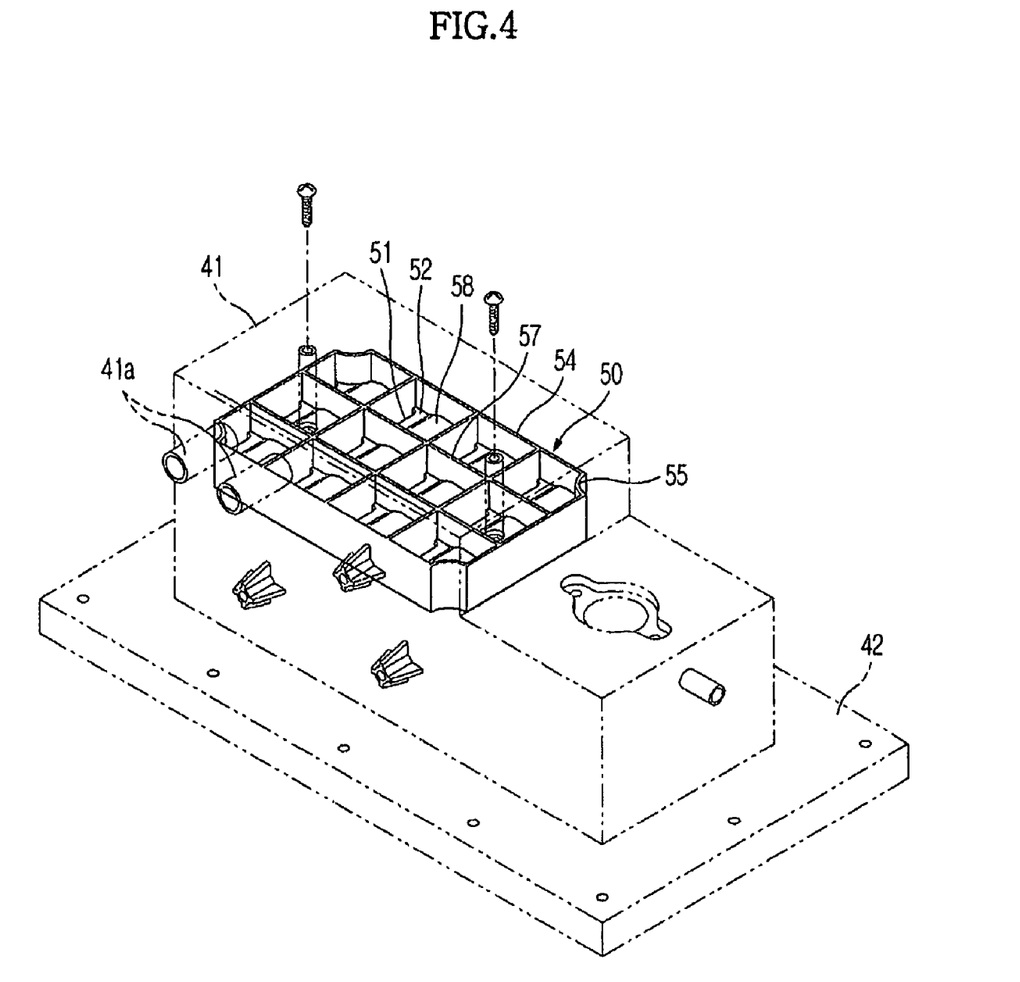
FIG. 4 is a perspective view showing a barrier unit of the steam generator of FIG. 3.
Figure 5A:
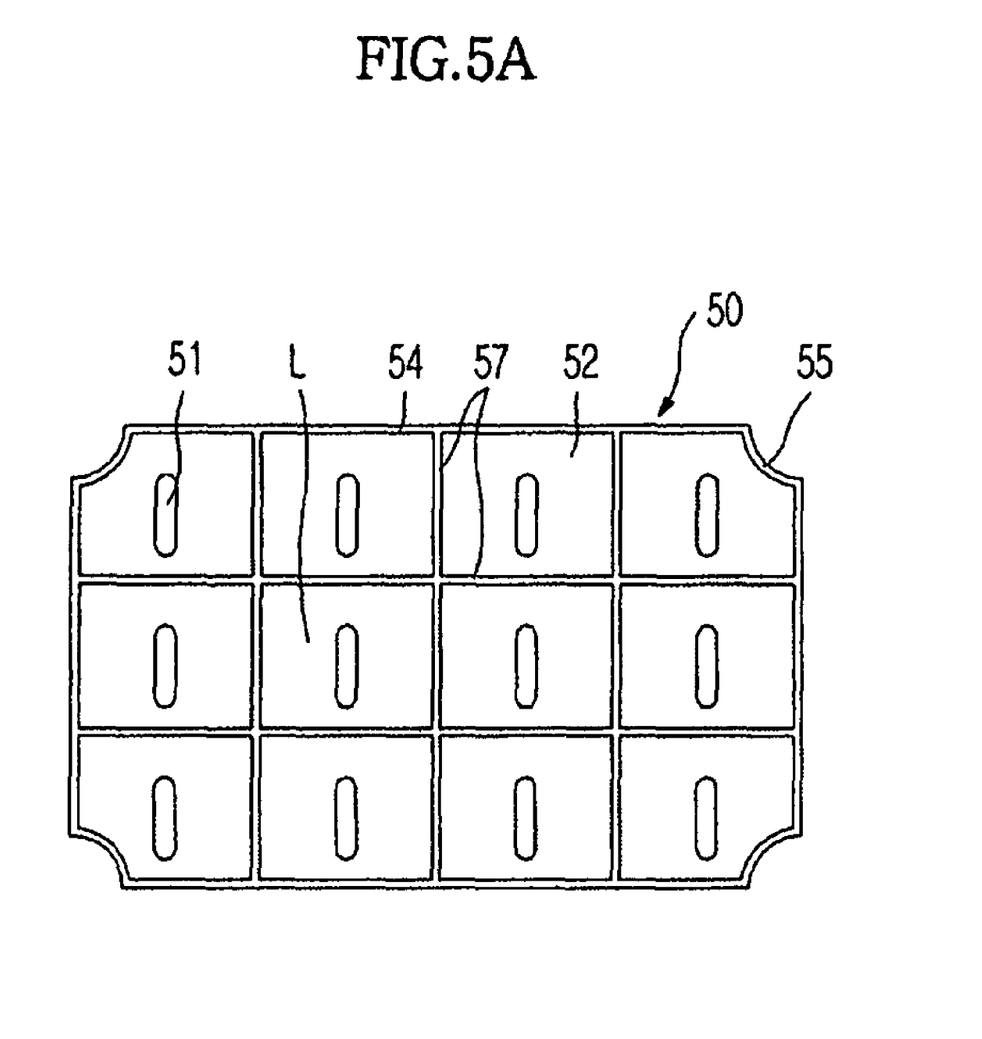
FIGS. 5A to 5C are plan views of barrier units according to embodiments of the present invention.
Figure 5B:
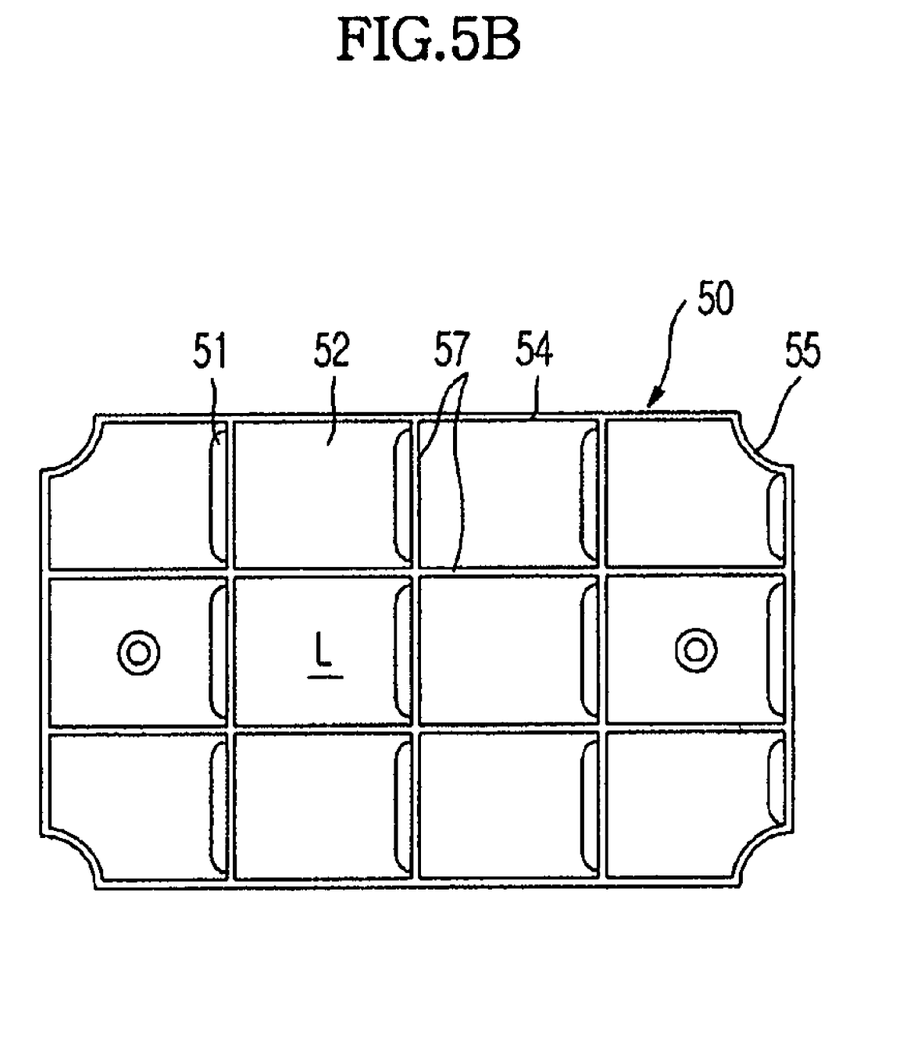
Figure 5C:
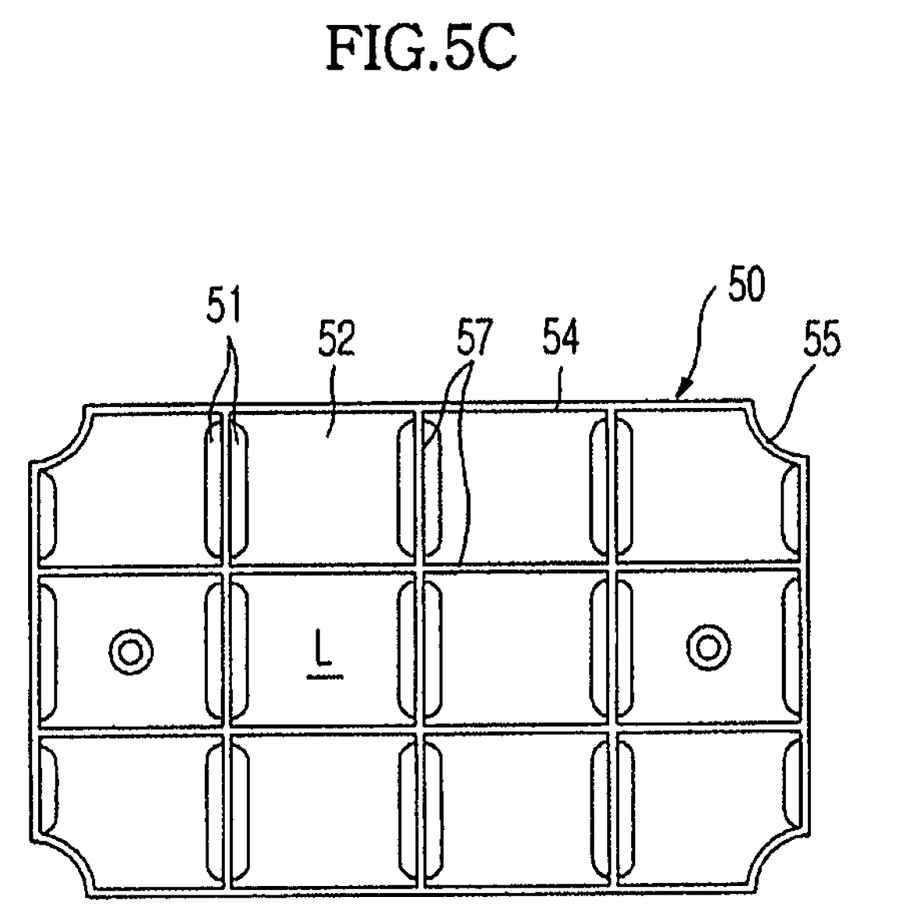
Figure 6A:
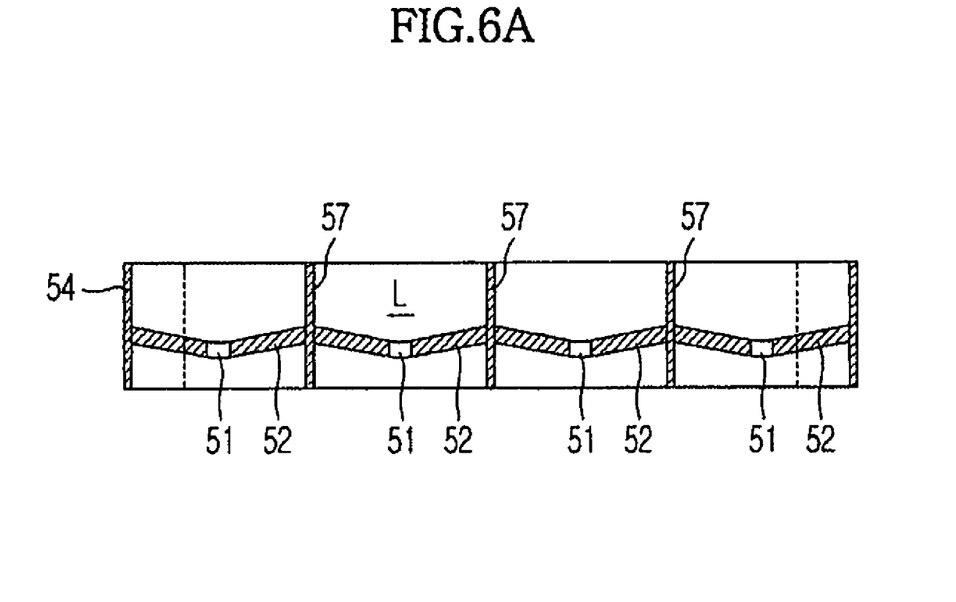
FIGS. 6A to 6C are side sectional views of the barrier units of FIGS. 5A to 5C, respectively.
Figure 6B:
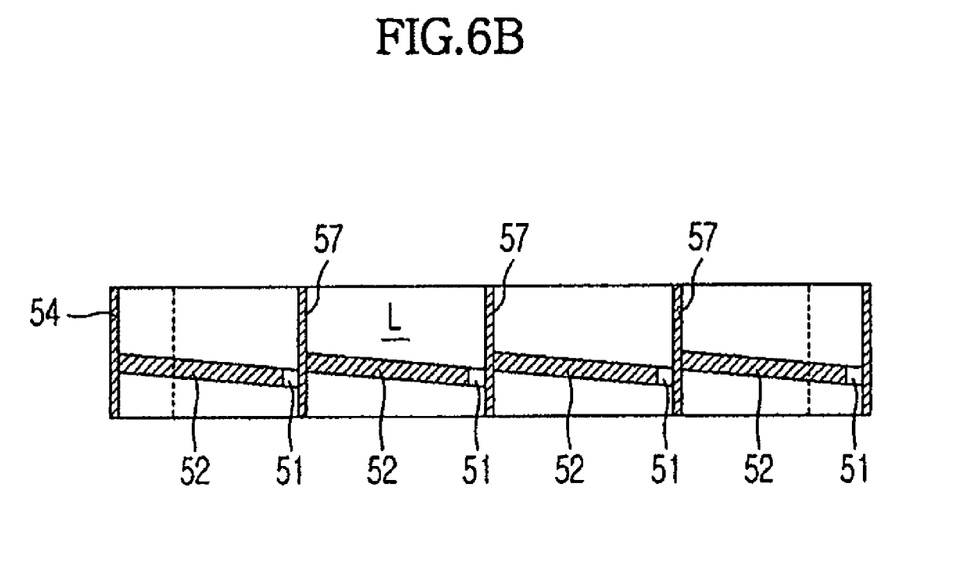
Figure 6C:
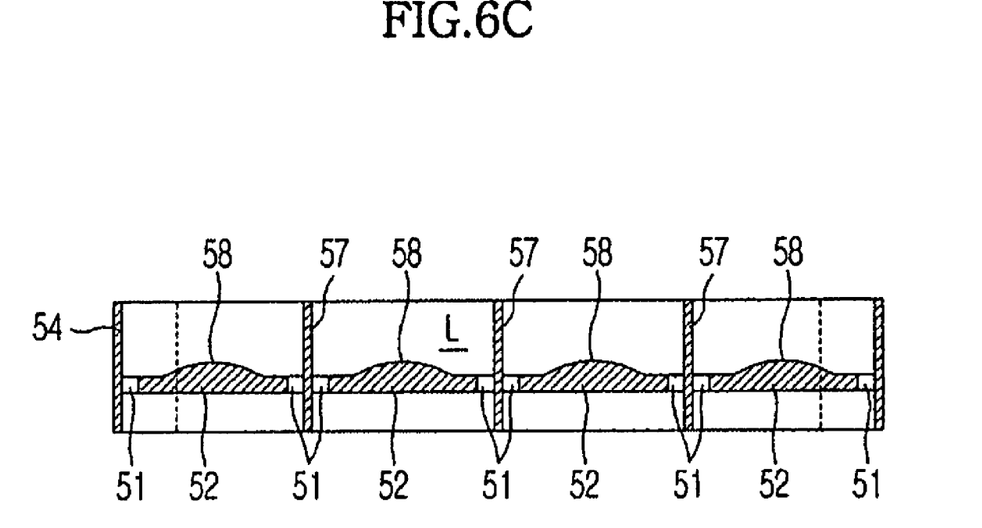

FIGS. 4 to 6 are views showing the barrier unit 50. As shown, the barrier unit 50 is received in the steam container 41 at a position right below a lower end of the steam ejection hole 41a, that is to say, at a position between the steam ejection hole 41a and the water stored in the steam container 41. The barrier unit 50 is bolted to an upper surface of the steam container 41. In this case, although a distance between the barrier unit 50 and the steam ejection hole 41a is not greatly restricted, the barrier unit 50 is spaced apart from the surface of water to some extent, but maintained at a close distance sufficient to burst the air bubbles generated in the course of boiling water before the air bubbles grow to a large size.

The barrier unit 50 includes a base plate 52 having a plurality of steam passage holes 51 and a web plate 54 provided to achieve a close adhesion with an inner wall surface of the steam container 41 so as to prevent air bubbles from rising along the inner wall surface of the steam container 41. The web plate 54 is configured to surround a periphery of the base plate 52, so as to prevent thermal deformation of the barrier unit 50. The web plate 54 has chamfered corners 55 to facilitate the easy assembling of the barrier unit 50. The chamfered corners 55 serve to prevent deterioration in the assembling efficiency of the barrier unit 50 relative to the steam container 41 due to manufacturing errors.

According to the present invention, the steam passage holes 51 of the base plate 52 have an elongated shape. The elongated steam passage holes 51 are efficient to increase a passage amount of steam per hour therethrough and also, to prevent the disadvantageous growth of air bubbles due to bubble cohesion between the neighboring steam passage holes 51.

Also, the barrier unit 50 includes a plurality of lattice members 57, to prevent the base plate 52 from being deformed by a high temperature. The plurality of lattice members 57 have the same height as that of the web plate 54 and are arranged to support the base plate 52 with a predetermined regular distance. Accordingly, with the provision of the lattice members 57, the base plate 52 has no risk of thermal deformation even if an interior temperature of the steam container 41 increases beyond 100 degrees Celsius.

Each of the lattice members 57 is mounted to protrude upward and downward from the base plate 52. An upwardly protruding portion of the lattice member 57, as described above, has the same height as that of the web plate 54, whereas a downwardly protruding portion of the lattice member 57 extends slightly beyond the base plate 52, so as to allow water droplets having passed through the steam passage holes 51 to flow therealong.

Each of the steam passage holes 51 is separated to be arranged at both sides of a lattice member 57. Each steam passage hole 51 is arranged to come into contact with the adjacent lattice member 57. These arrangements have the effect of preventing water droplets formed at the steam passage holes 51 from being cohered with other water droplets formed at the neighboring steam passage holes 51 and allowing the water droplets to run down rapidly along the lattice members 57.

FIGS. 5A to 5C and 6A to 6C illustrate various embodiments of the barrier unit 50. In the illustrated embodiments, the barrier unit 50 has a plurality of rectangular unit lattices L, and at least one steam passage hole 51 is allotted to each rectangular unit lattice L to prevent water generated by the cooling of vapor from being gathered in the unit lattice L.

For example, as shown in FIG. 5A, each steam passage hole 51 may be formed at the center of the unit lattice L. In this case, the base plate 52 within the unit lattice L descends toward the steam passage hole 51 as shown in FIG. 6A. Alternatively, as shown in FIGS. 5B and 5C, each steam passage hole 51 may be formed to come into contact with the adjacent lattice member 57 defining the unit lattice L as described above. In this case, the base plate 52 within the unit lattice L may descend only in a direction as shown in FIG. 6B, or may have a raised portion 58 at the center thereof as shown in FIG. 6C. In particular, when two steam passage holes 51 are formed in a single unit lattice L as shown in FIGS. 5C and 6C, the two steam passage holes 51 are formed to come into contact with the lattice members 57 facing each other, respectively, and the raised portion 57 is formed between the two steam passage holes 51. This is efficient to prevent the steam passage holes 51 from adjoining each other.

Now, the operation of the steam generator 40 having the above described barrier unit 50 and the operation of the heating cooking apparatus having the steam generator 40 will be described.

If a cooking operation begins, the water supply pump 33 is operated to supply water of the water tank 31 into the steam container 41 of the steam generator 40 through the water supply pipe 32. The water introduced into the steam container 41 is heated by the steam heater 42, to generate steam. The generated steam is discharged through the steam ejection hole 41a, so as to be supplied into the cooking compartment 10 through the steam supply pipe 43. In this case, the steam in the cooking compartment 10 is overheated by the operation of both the convection modules 21, to cook food disposed in the cooking compartment 10.

Meanwhile, the water stored in the water tank 31 continuously generates air bubbles during the generation of the steam. The air bubbles burst prior to growing to a large size as a result of coming into contact with the barrier unit 50. Also, water droplets, which are formed on the base plate 52 of the barrier unit 50, are expelled through the elongated steam passage holes 51 under the assistance of the raised portions 58 between the steam passage holes 51 as well as the inclination of the base plate 52. Here, when each lattice member 57 is arranged to separate the neighboring steam passage holes 51 from each other, the growth of the water droplets in the steam passage holes 51 can be efficiently prevented.

If the cooking operation is completed, the supply of power to the steam heater 42 is intercepted and the drain valve 47 is opened to discharge the water stored in the steam container 41.

As apparent from the above description, the embodiments of the present invention provide a steam generator and a heating cooking apparatus having the same. The steam generator includes a barrier unit, which is installed between a steam ejection hole of the steam generator and water stored in a water tank and has a plurality of steam passage holes. With the provision of the barrier unit, it is possible to guarantee stable supply of steam through the steam passage holes while preventing air bubbles, water droplets and other impurities generated in the course of boiling the water from entering the steam ejection hole.

Further, according to the embodiments of the present invention, the barrier unit of the steam generator has lattice members suitable for preventing thermal deformation thereof. Furthermore, according to the embodiments of the present invention, each of the lattice members serves to separate the neighboring steam passage holes having an elongated hole shape from each other, thereby serving to efficiently restrict the growth of the water droplets.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A steam generator comprising:
   a steam container to store water therein and having at least one steam ejection hole formed at an upper location thereof;
   a heater to boil the water stored in the steam container so as to generate steam; and
   a barrier unit provided below the steam ejection hole and adapted to prevent air bubbles generated in the course of boiling the water stored in the steam container by the heater from entering the steam ejection hole,
   the barrier unit comprising:
   a base plate having a plurality of steam passage holes, and
   a web plate coming into contact with an inner wall surface of the steam container.

2. The steam generator according to claim 1, wherein the steam passage holes have an elongated shape.

3. The steam generator according to claim 1, wherein the barrier unit further comprises a plurality of lattice members formed at the base plate.

4. The steam generator according to claim 3, wherein the lattice members are configured to protrude upward and downward from the base plate.

5. The steam generator according to claim 3, wherein the lattice members define a plurality of unit lattices, each of the unit lattices comprising at least one of the plurality of steam passage holes.

6. The steam generator according to claim 5, wherein each of the steam passage holes contacts a respective one of the lattice members.

7. The steam generator according to claim 6, wherein each unit lattice comprises two of the steam passage holes respectively contacting two of the lattice members, the two of the lattice members facing each other.

8. The steam generator according to claim 5, wherein the base plate within each respective unit lattice descends toward the steam passage hole formed at the respective unit lattice.

9. The steam generator according to claim 7, wherein the base plate within each respective unit lattice descends.

10. The steam generator according to claim 7, wherein the base plate within each respective unit lattice has a convex shape.

11. The steam generator according to claim 1, wherein the barrier unit has chamfered corners.

12. A heating cooking apparatus comprising:
a housing;
a cooking compartment;
an electric equipment chamber provided in the housing; and
a steam generator provided in the electric equipment chamber to supply steam into the cooking compartment,
the steam generator comprising:
a steam container to store water therein and having at least one steam ejection hole formed at an upper location thereof,
a heater to boil the water stored in the steam container, so as to generate steam, and
a barrier unit provided below the steam ejection hole to prevent air bubbles generated in the course of boiling the water stored in the steam container by the heater from entering the steam ejection hole.

13. The heating cooking apparatus according to claim 12, wherein the barrier unit comprises a base plate having a plurality of steam passage holes and a web plate coming into contact with an inner wall surface of the steam container.

14. The heating cooking apparatus according to claim 13, wherein the steam passage holes have an elongated shape.

15. The heating cooking apparatus according to claim 13, wherein the barrier unit further comprises a plurality of lattice members, and
the respective neighboring steam passage holes are arranged in the base plate to be separated from each other by a respective one of the plurality of lattice members.

16. The heating cooking apparatus according to claim 15, wherein each steam passage hole contacts a respective one of the lattice members.

17. The heating cooking apparatus according to claim 13, wherein the respective neighboring steam passage holes have different heights.

18. A steam generator comprising:
a container defining a hole to eject steam; and
a barrier unit upstream from the hole to prevent air bubbles from entering the hole, wherein the barrier unit comprises:
a base plate; and
a web plate surrounding a periphery of the base plate.

* * * * *